(12) United States Patent
Suzuki

(10) Patent No.: US 7,237,146 B2
(45) Date of Patent: Jun. 26, 2007

(54) SECURING METHOD OF DATA TRANSFER AND DATA TRANSFER SYSTEM PROVIDED THEREWITH

(75) Inventor: Kouichi Suzuki, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 390 days.

(21) Appl. No.: 10/413,522

(22) Filed: Apr. 15, 2003

(65) Prior Publication Data
US 2004/0153726 A1 Aug. 5, 2004

(30) Foreign Application Priority Data
Apr. 16, 2002 (JP) ............... 2002-113155

(51) Int. Cl.
*G06F 11/00* (2006.01)
(52) U.S. Cl. ............... 714/15; 714/5; 714/25
(58) Field of Classification Search ............ 714/5, 714/15, 22
See application file for complete search history.

(56) References Cited

U.S. PATENT DOCUMENTS

| 6,175,933 B1 * | 1/2001 | Cadden ............ 714/15 |
| 6,457,136 B1 * | 9/2002 | Sugiura ............ 713/340 |
| 6,480,944 B2 * | 11/2002 | Bradshaw et al. ...... 711/162 |
| 6,658,590 B1 * | 12/2003 | Sicola et al. ............ 714/6 |

FOREIGN PATENT DOCUMENTS

| JP | 8-83243 | 3/1996 |
| JP | 9-265436 | 10/1997 |
| JP | 11-134308 | 5/1999 |

* cited by examiner

*Primary Examiner*—Scott Baderman
*Assistant Examiner*—Tim Bonura
(74) *Attorney, Agent, or Firm*—Wenderoth, Lind & Ponack, L.L.P.

(57) ABSTRACT

A data transfer system is provided for preventing a slave device from operating erroneously or running out of control upon resuming communication after communication is interrupted due to the occurrence of abnormal circumstances such as a power failure and the like. A master device transmits a stop condition to the slave device for terminating communication and performs a power failure-processing task when abnormal circumstances such as a power failure or a momentary power failure occurs. The master device transmits a stop condition for terminating communication upon either the occurrence of abnormal circumstances or the resumption of communication subsequent to the recovery of the abnormal circumstances, and transmits a start condition for reestablishing communication after transmitting a stop condition to the slave device. The slave device terminates communication upon receipt of either stop condition and reestablishes communication upon receipt of a start condition.

3 Claims, 3 Drawing Sheets

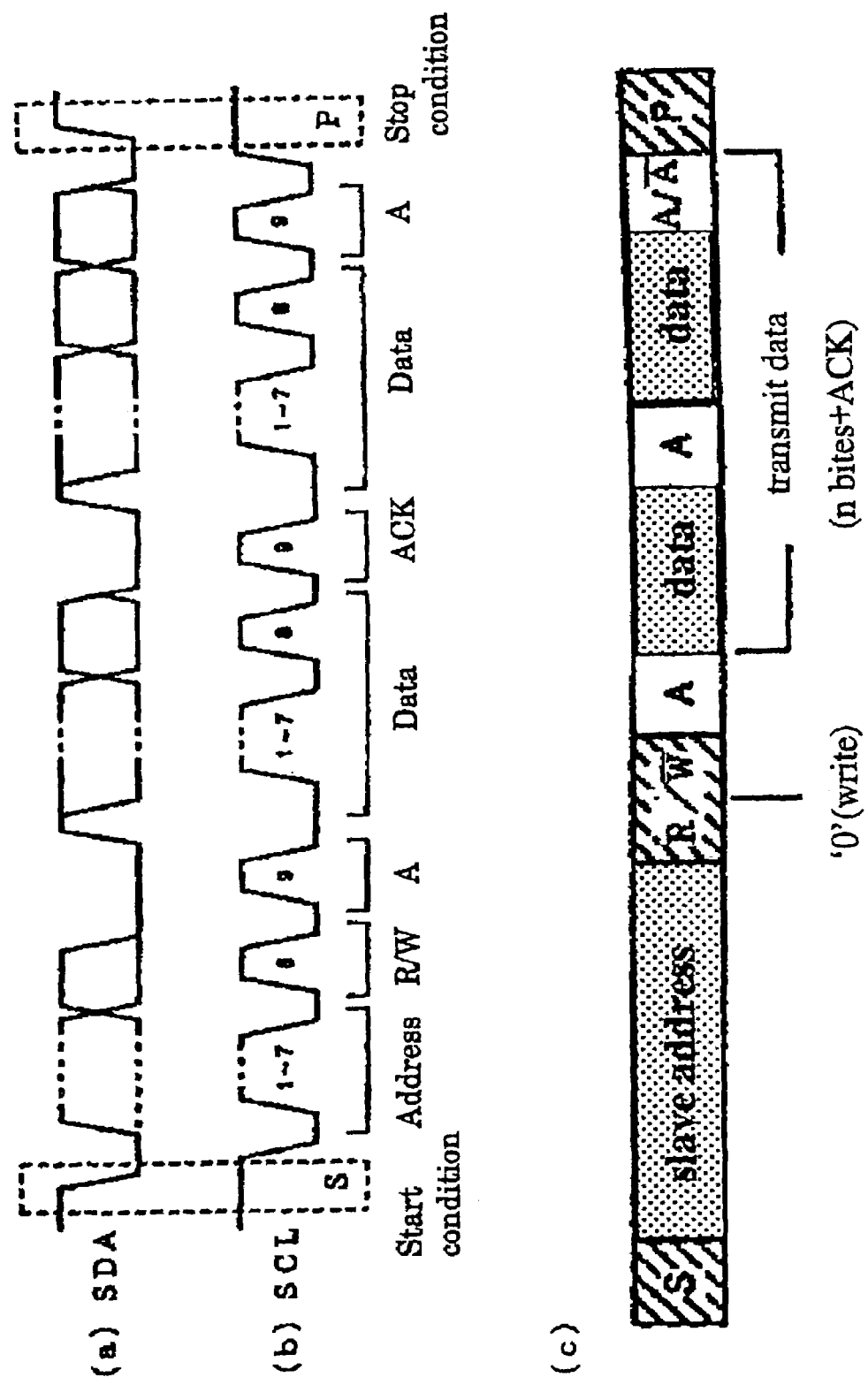

SECURING METHOD OF DATA TRANSFER AND DATA TRANSFER SYSTEM PROVIDED THEREWITH

BACKGROUND OF THE INVENTION

1. Field of the Invention

The present invention relates to a data transfer system for transferring data by transmitting data bi-directionally between a master device and a slave device connected with each other by a bus line such as an I2C bus.

2. Description of the Related Art

Such a data transfer system using an I2C (Inter-Integrated Circuit) bus connected between a master device and a slave device is described in Japanese Laid-Open Patent Application No. 9-265436. Such a data transfer system comprises a master device, such as a microcomputer, and a plurality of slave devices, such as a nonvolatile memory, IC, etc., that are connected with each other by two bus lines, namely a SDA line (a data transmission line) and a SCL line (a clock transmission line).

As shown in FIG. 3, a data transfer starts when a start condition S, i.e. a start condition of data transfer, is transmitted from a master device to a designated one of slave devices. The master device generates clock signals and transfers data. When a stop condition P, i.e. a stop condition of data transfer, is transmitted from the master device, data communication is stopped. Transferred data are formatted as shown in FIG. 3 (c).

In case a power failure or a momentary power failure occurs when data communication is made between the master device and the slave device, the operation of the master device and the slave device is stopped due to an interruption of power supply, and the communication is suspended just as it is. The master device also ceases to communicate in an abnormal state such as influences of disturbances, malfunctions and the like.

When a power failure or a momentary power failure is recovered and a power supply is reestablished, or an abnormal termination is reset to start, the master device becomes operable. In this case, the master device transmits a start condition to the slave device without taking into account the conditions of the slave device and the communication is commenced therebetween. When the communication cannot be commenced, some trials are repeated.

The master device commands a termination of operation immediately in response to a power failure or a momentary power failure to shutdown the operation as a power failure-processing task. The slave devices, however, do not perform such a power failure-processing task. Furthermore, there exists such a slave device that can operate with a lower power supply voltage and a slave device stops to operate under quite a lower power supply voltage as compared with the master device.

Accordingly, even when the master device ceases to operate due to an interruption of a power supply, a slave device still continues to operate until a power supply voltage decreases to some degree. In case a momentary power failure is recovered during this period, the master device starts to operate and commences communication. As the operation of a slave device is not suspended, the slave device determines that communication is still continued, and the slave device does not operate to terminate communication. Consequently, it is likely that the slave device makes an erroneous judgment on data that is transferred by the resumed communication. Thus, there occurs such problems that data stored in the slave device are rewritten by mistake, or that the slave device operates on the basis of mistaken data and finally runs out of control.

Furthermore, it is likely that the resumed communication becomes unstable due to noises caused by an interruption or recovery of a power supply and the slave device erroneously recognizes the noises as data, and consequently the slave device operates erroneously.

A stable operation can be ensured, even in a power interruption, by adding a back-up circuit for stabilizing a power supply source. However, such a measure requires a circuit design that is suitable for a system and increases the number of parts, which results in an increase of manufacturing costs.

SUMMARY OF THE INVENTION

It is, therefore, an object of the present invention to provide a data transfer system which can make a stable communication without causing erroneous operations when a communication is resumed after suspension due to an abnormal state such as a power failure.

The present invention provides a data transfer system for transferring data by communicating between a master device and a slave device. The master device is provided with a terminating means which transmits signals for terminating communication to the slave device in case of a suspension of communication due to the occurrence of abnormal circumstances, and a commencing means which transmits signals for commencing communication, upon resuming communication, to the slave device after transmitting signals for terminating communication.

Abnormal circumstances may include a power failure, a momentary power failure, a hang-up or the like. For example, in case a power supply to the respective devices is interrupted due to a power failure or a momentary power failure during communication, the master device, prior to conducting a power failure-processing task, transmits signals for terminating communication to the slave device, and transmits signals for commencing communication, upon resuming communication subsequent to the recovery of the power supply, to the slave device after transmitting signals for terminating communication.

The master device transmits signals for terminating communication several times to the slave device until the communication is resumed after the communication is suspended due to the occurrence of abnormal circumstances.

Thus, the master device transmits signals for terminating communication when communication is suspended, and further transmits signals for terminating communication prior to commencing communication. With such an arrangement, the slave device can receive either of the above signals for terminating communication without fail prior to receiving signals for commencing communication.

In case the slave device is still in operation at the time of the occurrence of abnormal circumstances, the slave device can receive signals for terminating communication and terminate communication normally. In case the slave device is not in operation or in transit, the slave device cannot receive signals from the master device. In this case, the slave device becomes operable when abnormal circumstances are resolved to be normal and likely recognizes that communication is still continued. As a result, the slave device operates erroneously on the basis of mistaken data and runs out of control. The slave device, however, receives signals for terminating communication from the master device as mentioned above, and then the slave device can once terminate communication. By receiving signals for commencing communication, the slave device can operate to communicate regularly.

BRIEF DESCRIPTION OF THE DRAWINGS

FIG. 3 is a format at the time when an I2C bus transfers data, wherein FIG. 3(a) depicts data in a data transmission line, FIG. 3(b) depicts a clock in a clock transmission line, and FIG. 3(c) depicts a data array.

DETAILED DESCRIPTION OF THE PREFERRED EMBODIMENTS

Figure 1:
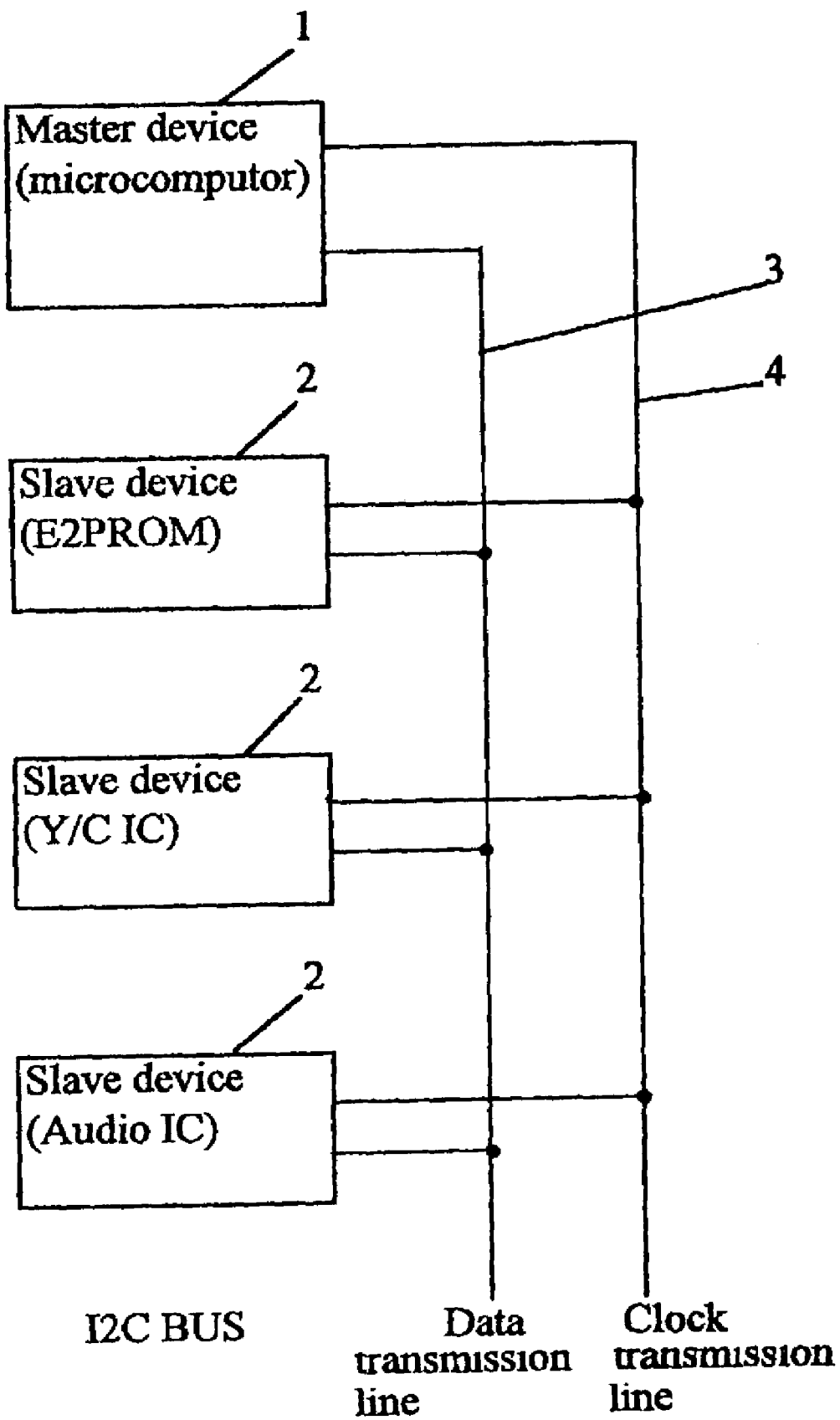
FIG. 1 is a block diagram showing a data transfer system according to the present invention.

One embodiment of the data transfer system according to the present invention is shown in FIG. 1. As in the case of a conventional system employing an I2C bus, a master device 1 composed of a microcomputer and a plurality of slave devices 2 are connected through a data transmission line 3 and a clock transmission line 4. This data transfer system is applied to video equipments such as a TV, VCR, DVD and the like. The slave devices 2 are a nonvolatile memory (E2PROM), Y/C IC, audio IC, chroma IC, switch IC and the like.

The master device 1 has a terminating function which transmits a stop condition as signals for terminating communication to the slave devices 2 in order to terminate communication at the time of the occurrence of abnormal circumstances during communication. The master device 1 also has a resuming function which transmits a start condition as signals for resuming communication to the slave devices 2 after transmitting a stop condition at the time abnormal circumstances are resolved and communication is resumed.

Figure 2:
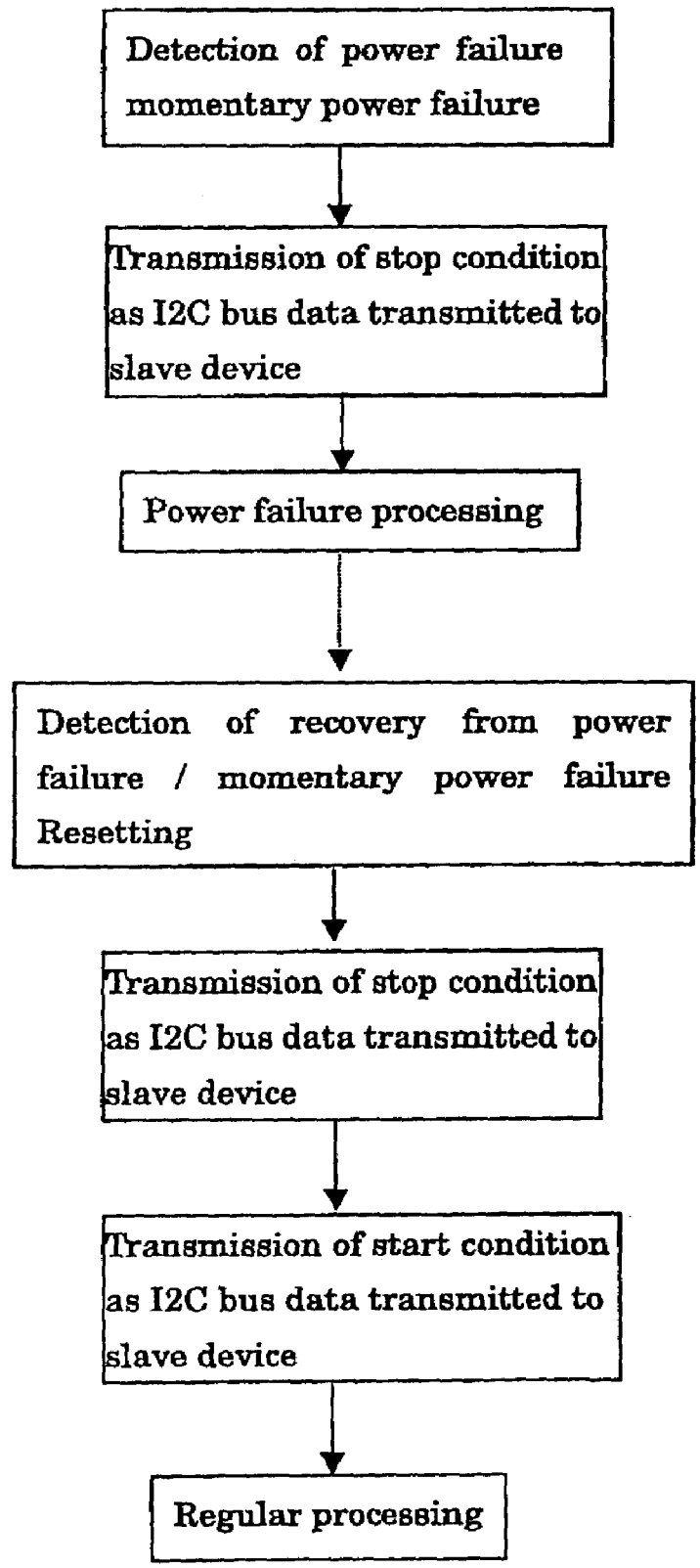
FIG. 2 is a flow chart showing the operation of the master device in case of an occurrence of abnormal circumstances.

Next, the operation at the time of an occurrence of abnormal circumstances will be explained in accordance with the accompanying FIG. 2. The master device 1 detects variations of a power source voltage, and determines that an abnormal circumstance such as a power failure, a momentary power failure and the like occurs when the power source voltage decreases below a predetermined value. Subsequently, the master device 1 transmits a stop condition as I2C bus data to the slave device 2 in transit, and terminates communication. Thereafter, a power failure-processing task is implemented to suspend operation.

Although a power supply is interrupted due to a power failure and the like, the master device 1 receives an auxiliary power from a condenser and the like for performing a power failure-processing task. Accordingly, the master device 1 can transmit a stop condition even after the occurrence of a power failure and the like. A stop condition is also transmitted to terminate communication when the master device 1 is suspended due to the occurrence of some abnormal accidents.

The slave device 2 operates to suspend communication upon receipt of the stop condition, thereby ensuring that a data transfer suspended by the master device 1 is not continued at the slave device 2.

Although a power voltage is gradually decreased due to an interruption of power supply, the slave device 2 is operable for a certain period after the occurrence of a power failure since a power supply voltage for stopping the slave device 2 is considerably low. Accordingly, the slave device 2 can receive the stop condition from the master device 1 within this period.

When a power supply is resumed after resolving a power failure, the master device 1 detects a power voltage and determines that a normal state is recovered, and then starts to operate. In case the master device 1 is suspended due to the occurrence of abnormal circumstances, the operation is resumed by inputting reset signals. After waiting for a certain period (3 to 4 seconds, for example) until the operation becomes stable, communication is resumed. A start condition is transmitted after transmitting a stop condition as I2C bus data to the slave device 2 with which communication is made before a power failure occurs. Thereafter, a regular processing is conducted. In case the master device 1 is reset, data are read out from memories before conducting a regular processing.

When receiving a stop condition one more time, the slave device 2 operates to suspend communication again for enhancing certainty and security. Then, communication is resumed upon receipt of a start condition. In case the slave device 2 is arranged to detect the suspension of communication by receiving a first stop condition, the slave device 2 can determine that communication is terminated even if the slave device 2 again receives a stop condition after a recovery of a power supply or a reset operation, so that the slave device 2 can disregard the stop condition and does not operate to suspend. Accordingly, in case a start condition is transmitted immediately after a stop condition is transmitted, the slave device 2 is ready to receive transmission and starts to communicate at once.

Due to the occurrence of an abnormal circumstance, the slave device 2 cannot occasionally receive a stop condition that is transmitted before communication is suspended. In this case, the slave device 2 determines that communication is continued after a recovery of a power supply or a reset operation, and tries to operate erroneously on the basis of the data that is transmitted before a power failure occurs. In case the master device 1 transmits a stop condition to the slave device 2 one more time, the slave device 2 can stop communication once upon receipt of the stop condition. The slave device 2 takes the suspended data as being invalid and operates on the basis of newly transferred data. The stop condition may be used as one of reset signals, so that the slave device 2 erroneously operated can be reset by receiving the stop condition to operate normally.

The present invention is not limited to the above-described specific embodiments but is subject to various changes and modifications. For example, the present data transfer system may be applied to communication using bus lines other than an I2C bus. Furthermore, in case a slave device starts slowly after a recovery of a power supply or a reset operation and cannot receive a stop condition transmitted from the master device, a stop condition may be transmitted several times prior to the transmission of a start condition.

Further, signals for terminating communication, which are transmitted from the master device to the slave device, may be used for one of reset signals. Also, signals for terminating communication, which are transmitted in case of the occurrence of abnormal circumstances, may be used for a stop condition, and signals for terminating communication, which are transmitted when abnormal circumstances are resolved, may be used for one of reset signals. By such arrangements, the slave device can be recovered from such conditions as erroneous operations and running out of control to normal operating conditions.

As apparent from the above-described explanation, the slave device can be informed without fail that the master device stops to communicate due to the occurrence of abnormal circumstances and does not make erroneous judgments of data, so that erroneous rewriting of data and running out of control are prevented.

As the slave device ceases to communicate without fail, the slave device is free of influence from noises caused by a shutdown of a power source or an input of power supply. Therefore, the slave device does not recognize noises as data and operate erroneously, and as a result, communication becomes stable. A backup circuit to be used for a power failure is not required, but a simple software processing is only required to cope with the occurrence of abnormal circumstances, and therefore, the manufacturing costs do not increase.

What is claimed is:

1. A data transfer system for transferring data and comprising a master device operable to communicate with a slave device, wherein said master device comprises:

terminating means for transmitting signals for terminating communication to the slave device upon a suspension of communication with the slave device due to an occurrence of abnormal circumstances, and upon resuming the communication with the slave device after recovery of the abnormal circumstances; and commencing means for transmitting signals for commencing communication, upon resuming communication with the slave device, to the slave device after said terminating means transmits the signals for terminating communication wherein said terminating means transmits the signals for terminating communication to the slave device without receiving a status signal from the slave device.

2. A data transfer system for transferring data and comprising a master device operable to communicate with a slave device, wherein said master device comprises:

terminating means for transmitting signals for terminating communication to the slave device prior to performing a power failure-processing task upon an interruption of a power supply to the slave device during communication with the slave device, and upon resuming communication with the slave device after the power supply to the slave device is restored; and commencing means for transmitting signals for commencing communication to the slave device, upon resuming communication after the power supply to the slave device is recovered, after said terminating means transmits the signals for terminating communication to the slave device, wherein said terminating means transmits the signals for terminating communication to the slave device without receiving a status signal from the slave device.

3. A data transfer system for transferring data and comprising a master device operable to communicate with a slave device, wherein said master device comprises:

first terminating means for transmitting signals several times for terminating communication to the slave device until communication with the slave device is resumed after the communication is suspended due to an occurrence of abnormal circumstances; and second terminating means for transmitting signals for terminating communication to the slave device upon resuming the communication with the slave device, wherein said first terminating means transmits the signals for terminating communication to the slave device without receiving a status signal from the slave device.

* * * * *